United States Patent [19]

Torisawa et al.

[11] Patent Number: 4,963,808

[45] Date of Patent: Oct. 16, 1990

[54] MOTOR CONTROL APPARATUS

[75] Inventors: Akira Torisawa, Machida; Noriaki Itou, Yokohama; Masaaki Kakizaki, Kawasaki; Hiroshi Kato, Yokohama; Shigeru Okamura, Kawasaki, all of Japan

[73] Assignee: Canon Kabushiki Kaisha, Tokyo, Japan

[21] Appl. No.: 401,483

[22] Filed: Aug. 30, 1989

Related U.S. Application Data

[63] Continuation of Ser. No. 259,259, Oct. 18, 1988, abandoned.

[30] Foreign Application Priority Data

| Oct. 21, 1987 | [JP] | Japan | 62-264018 |
| Feb. 25, 1988 | [JP] | Japan | 63-040841 |
| Feb. 25, 1988 | [JP] | Japan | 63-040842 |
| Feb. 25, 1988 | [JP] | Japan | 63-040843 |

[51] Int. Cl.$^5$ .................................... G05B 19/40
[52] U.S. Cl. ............................ 318/685; 318/696; 318/254; 318/653
[58] Field of Search ................ 318/685, 696, 254, 653

[56] References Cited

U.S. PATENT DOCUMENTS

| 4,228,387 | 10/1980 | Brown | 318/696 |
| 4,414,498 | 11/1983 | Gessner | 318/696 |
| 4,591,774 | 5/1986 | Ferris et al. | 318/696 |
| 4,604,575 | 8/1986 | Shimigu et al. | 318/653 X |
| 4,814,676 | 3/1989 | Van Hont | 318/254 |

FOREIGN PATENT DOCUMENTS

| 0023123 | 7/1980 | European Pat. Off. |
| 0027867 | 8/1980 | European Pat. Off. |
| 0076519 | 10/1982 | European Pat. Off. |
| 2727534 | 1/1979 | Fed. Rep. of Germany |
| 2755535 | 6/1979 | Fed. Rep. of Germany |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A motor control apparatus disclosed in this invention counts output signals from an encoder upon rotation of a rotor, and performs energization switching of a motor coil when the count value has reached a predetermined value.

10 Claims, 19 Drawing Sheets

MOTOR CONTROL APPARATUS

This application is a continuation of application Ser. No. 07/259,259 filed Oct. 18, 1988, now abandoned.

BACKGROUND OF THE INVENTION

1. Field of the Invention

The present invention relates to a motor control apparatus used in, e.g., office automation (OA) equipment such as a printer for a personal computer, a word-processor, or the like.

2. Related Background Art

For example, in a motor which can be driven as a brushless DC motor a Hall element is used for detecting a position of a magnetic pole of a rotor for performing energization control, and an optical or magnetic encoder is used for detecting a rotational speed of the rotor.

However, such a brushless motor poses the following problems.

(1 Position alignment between a stator magnetic pole and a Hall element is required.

(2) When energization switching is performed by the Hall element, since the positions of the Hall element and the stator are uniquely determined, the energization method of a motor is defined accordingly. For example, the electrical angular position of the Hall element is different with respect to the stator by 45°. Therefore, in order to perform two ways of energization control in one motor, the number of Hall elements is doubled, and the Hall elements must be arranged at positions suitable for energization control.

Note that Japanese Patent Laid-Open (Kokai) Nos. 62-193548 and 62-193549 disclose motors that can be driven as stepping motors for performing energization control using encoder outputs. These patents disclose only motor structures in which encoders are provided at predetermined positions, and there is no disclosure about a drive control circuit, method, and the like of the motor.

SUMMARY OF THE INVENTION

The present invention proposes a motor as driving means for OA equipment and has as a first object to provide a motor control apparatus wherein an angular position of a rotor of a motor is converted to a pulse signal by an encoder, and rotational control/energization switching of the motor is made by digital signal processing using the pulse signal, so that control accuracy of rotation, stop, speed, and the like can be improved.

When rotational control is performed using the pulse signal from the encoder, clock pulses are generated using an up-down clock generator in accordance with a rotation direction of the rotor. In this case, if a rotor is rotated by an equal rotational amount in different rotation directions, e.g., clockwise and counterclockwise directions, the same pulse counts cannot be obtained.

It is therefore a second object of the present invention to provide a motor control apparatus comprising up-down clock generating means capable of accurately obtaining clock pulses regardless of a difference in rotation direction when a pulse signal from an encoder is converted to clock pulses.

It is a third object of the present invention to improve position detection accuracy of a rotor by resetting a motor driving signal generator not by a signal from an up-down counter but by an external control apparatus in an apparatus in which a pulse signal from an encoder is converted to clock pulses, a rotation direction of a rotor is controlled by the up-down counter, and a signal from the up-down counter is input to a motor driving signal generator comprising a digital comparator, a clock generator, a rotation direction switch, and a start-stop controller so as to drive a motor.

DESCRIPTION OF THE PREFERRED EMBODIMENTS

FIGS. 1 to 15 show a first embodiment of the present invention.

Figure 1:
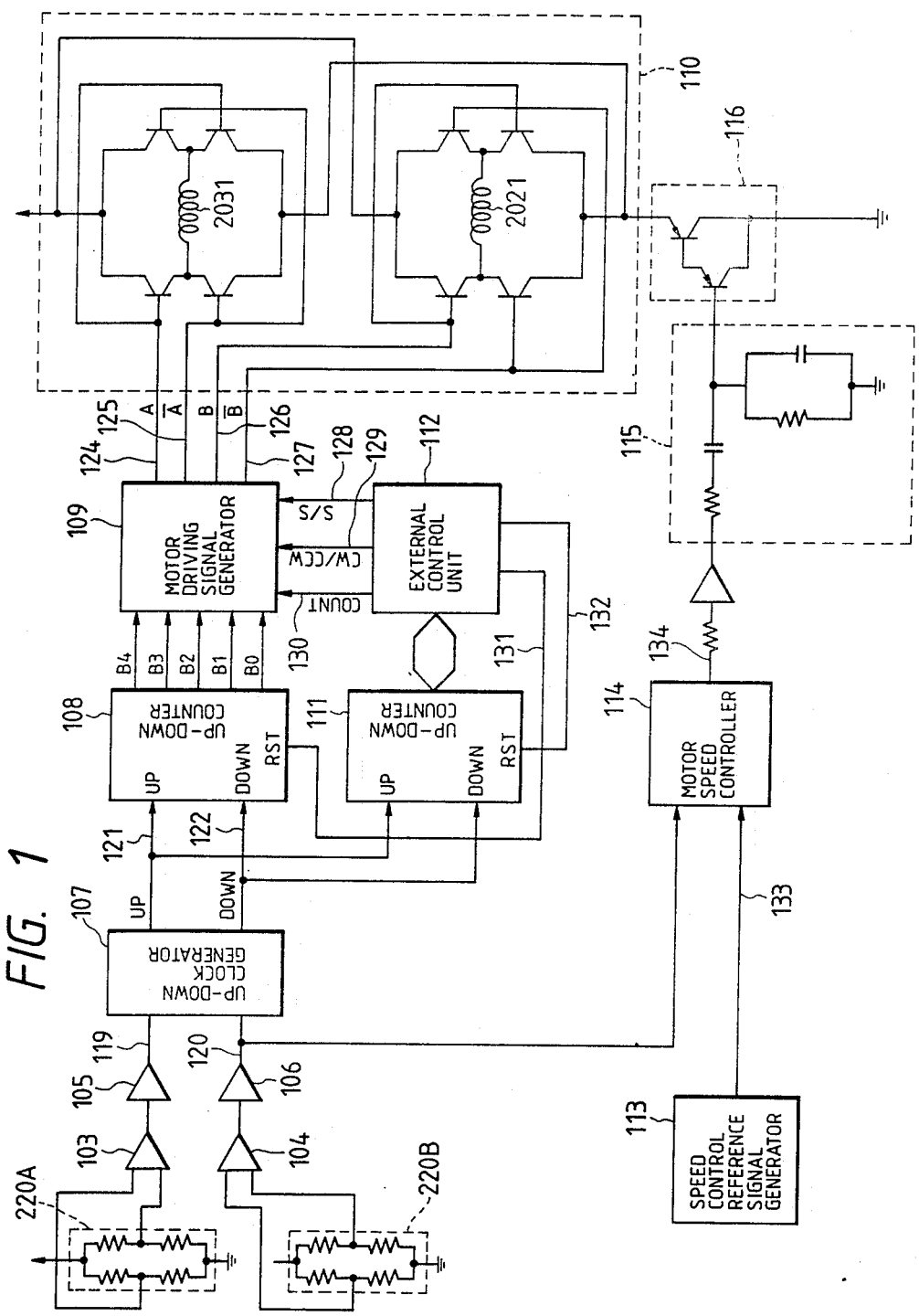
FIG. 1 is a circuit diagram of a control system of each embodiment of a motor according to the present invention.
Figure 2:
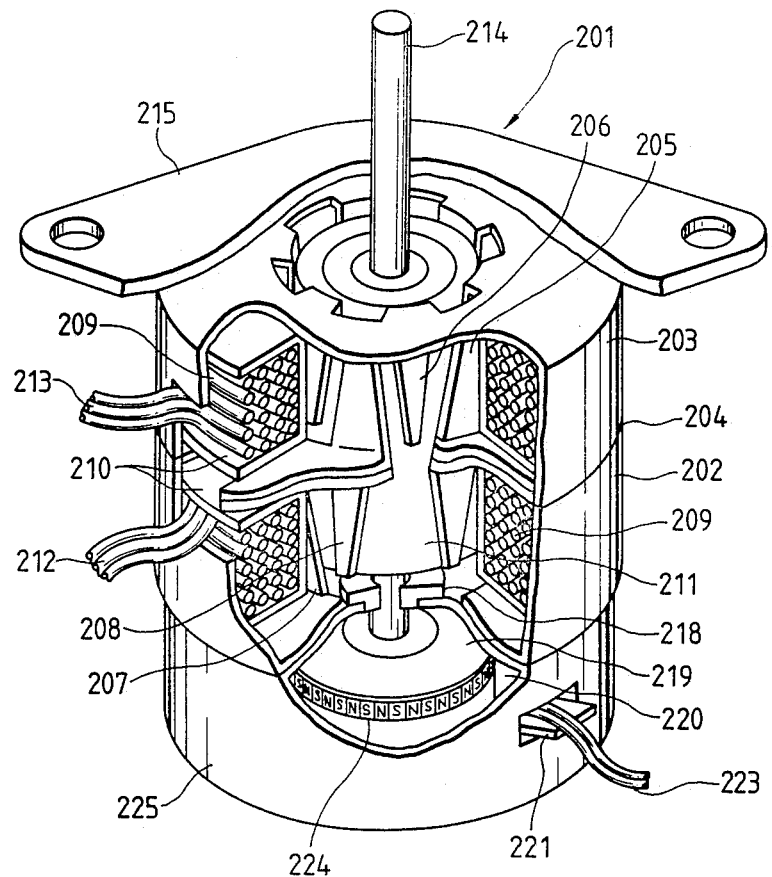
FIG. 2 is a perspective view of a first embodiment of a motor according to the present invention.
Figure 3:
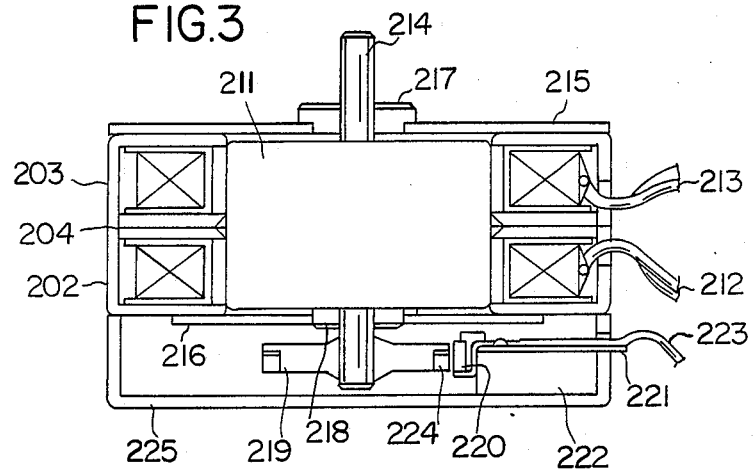
FIG. 3 is a sectional view of the first embodiment.

FIG. 1 shows a drive control circuit of a motor. FIG. 2 is a perspective view of the motor, and FIG. 3 is a sectional view of the motor.

A motor 201 (FIG. 2) incorporates a magnetic encoder, and can perform stepwise rotation. The motor 201 has a stator unit 204 having a structure in which two stators 202 and 203 having hollow magnetic rings are vertically stacked. The surface of each of the stators 202 and 203 is formed of a magnetic member, and a large number of magnetic segments (indicated by reference numerals 205 and 206 in the stator 203 and indicated by reference numerals 207 and 208 in the stator 202) for alternately forming N and S magnetic poles in a circumferential direction are alternately formed in their inner peripheral portions at small intervals. Bobbins 210 around which conductive wires 209 are wound by a large number of turns are fitted in hollow portions.

The magnetic segments (205, 206, 207, and 208) are disposed and fixed in upper and lower stages to oppose each other in the axial direction. The width of each of the magnetic segments (205, 206, 207, and 208) is equal to a magnetic pole width (in the circumferential direction) of a magnet rotor 211. The magnetic segments 205 and 207 are formed by extending upward magnetic member portions of the lower surfaces of the stators 202 and 203 to be offset from each other by a ¼ pitch. The magnetic segments 206 and 208 are formed by extending downward magnetic member portions of the upper surfaces of the stators 202 and 203 to be offset from each other by a ¼ pitch. Lead wires 212 and 213 are connected to the conductive wires of the stators 202 and 203, respectively.

The cylindrical magnet rotor 211 is fixed to a rotating shaft 214 to be pivoted together. The magnet rotor 211 is supported on bearings 217 and 218 respectively mounted in flanges 215 and 216 welded to the stators 202 and 203 so as to be rotatably arranged in an inner hollow portion of the stator unit 204. The magnet rotor 211 may be an appropriate one such as a plastic magnet or a magnet formed by sintering. N and S magnetic poles are radially oriented and alternately formed to oppose the magnetic segments (205, 206, 207, and 208). The rotating shaft 214 projects from the lower end of the bearing 218 mounted in the flange 216 welded to the stator 202. A magnetic encoder 219 is mounted on the projecting portion of the rotating shaft 214. A total of 218 N and S magnetic poles are formed on the entire peripheral edge of the encoder 219 at small intervals. A magnetic sensor (MR element) 220 for outputting A- and B-phase signals having an electrical phase difference of 90° is disposed at a position facing a magnetic pole portion 224 (peripheral edge portion) of the magnetic encoder 219.

The magnetic sensor (MR element) 220 is mounted on a fixing member 222. Output signals from the sensor 220 are supplied to a control circuit (shown in FIG. 1) through lead wires 223 soldered on a circuit board 221. The fixing member 222 on which the magnetic sensor (MR element) 220 is fixed is mounted on an inner bottom portion of a metal cup type magnetic encoder case 225. The case 225 protects the magnetic pole portion 224 and the magnetic sensor (MR element) 220 from dust.

The number of magnetic poles of the rotor 211 is 24, and the number of magnetic poles of the magnetic encoder 224 is an integer multiple of 24, i.e., 288. Therefore, the encoder output pulse count per rotor pole corresponds to 12 pulses.

In this embodiment, a rotational angle per pulse of the encoder output is 1.25°/pulse (360°/288 pulses), and is a sufficiently smaller value than the rotational angle of 15° per rotor pole. More specifically, an error of angular positions between the encoder output pulses and the rotor magnetic pole is a maximum of ±0.625° even if no adjustment is made. This error corresponds to an error of about 4.2% per rotor pole, and can be ignored. The relationship between the encoder output pulse count and the number of rotor magnetic poles can be set within the range of an allowance. The encoder output pulse count per revolution of the rotor can be an integer multiple of the number of rotor magnetic poles. In general, an error of ±12.5% is allowed, and in this case, the pulse count corresponds to four times the number of rotor magnetic poles.

Note that when the number of rotor magnetic poles is 100 like in a hybrid motor driven as a stepping motor, accurate alignment is necessary when the encoder output pulse count and the number of rotor magnetic poles have a one-to-one correspondence like in a conventional Hall element and other encoders. However, according to the present invention, the output pulse count of the encoder is set to fall within the range of 400 to 500, so that a motor having a hybrid stepping motor structure can be driven as a DC brushless motor without alignment. Such an output pulse count can be readily realized by a magnetic encoder having a magnetizing pattern of a wavelength of 0.334 μm and a diameter of 26.6 mm (a structure shown in FIGS. 2 and 3) and a magnetoresistive element (MR element).

FIG. 1 shows a control circuit of the motor with the above structure. In FIG. 1, the control circuit includes magnetoresistive elements (MR elements) 220A and 220B (indicated by reference numeral 220 in FIGS. 2 and 3), differential amplifiers 103 and 104, comparators 105 and 106, an up-down clock generator 107 for generating up and down clocks, an up-down counter 108, a motor driving signal generator 109, a motor driving circuit 110, a position detection (up-down) counter 111, an external control unit 112, a speed control reference signal generator 113, and a motor speed controller 114. The operation of the driving circuit will be explained with reference to FIG. 1.

Figure 4A:
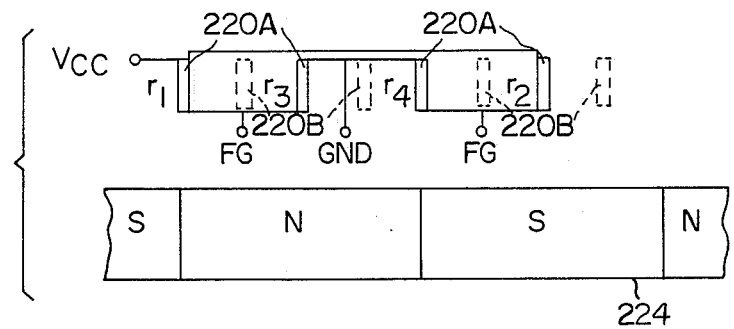
FIG. 4A is a view showing the relationship between an MR element and an encoder in the first embodiment.
Figure 4B:
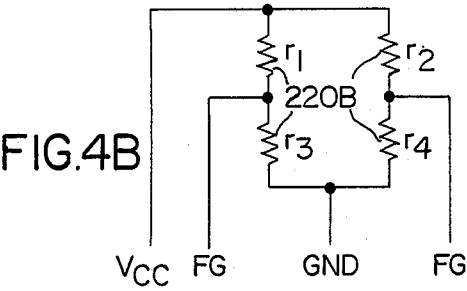
FIG. 4B is an equivalent circuit diagram of the MR element.
Figure 5:
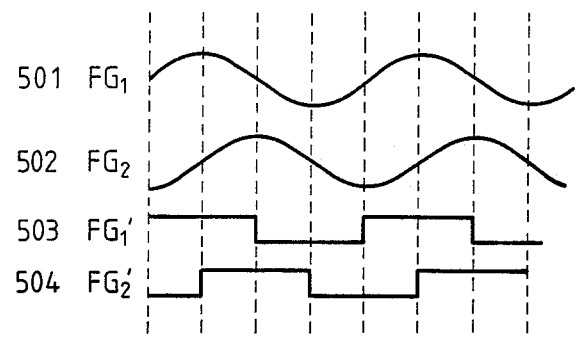
FIG. 5 is a timing chart showing output signals from the MR element.
Figure 6:
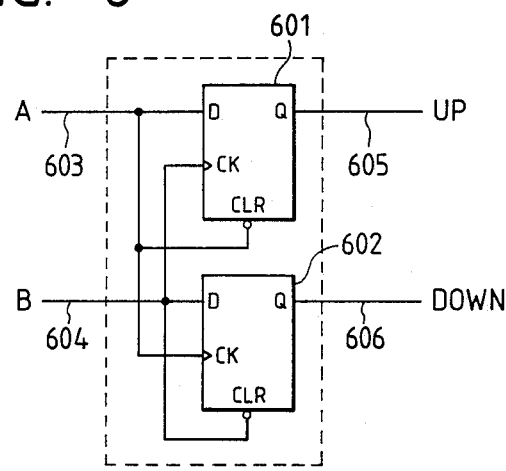
FIG. 6 is a circuit diagram of an up-down clock generator.
Figure 7:
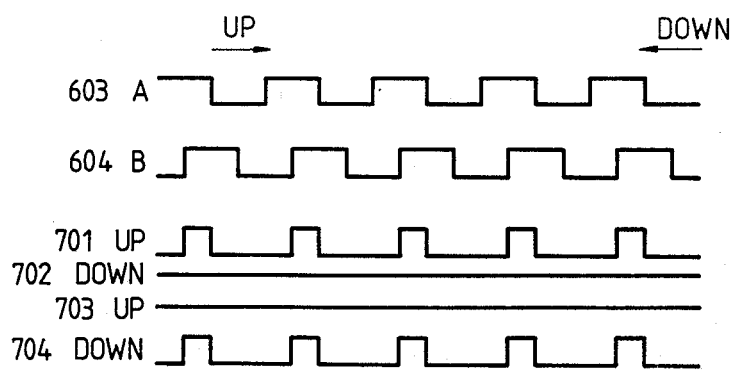
FIG. 7 is a timing chart showing input/output signals from the up-down clock generator.

In the MR element 220A, as shown in FIG. 4 (in FIG. 4A, the MR element 220A is indicated by solid lines, and the element 220B is indicated by dotted lines; although FIG. 4B illustrates only the MR element 220A, the element 220B has the same structure), four magnetoresistive elements r1 to r4 are arranged along the magnetic pole alignment direction of the encoder 224, and are bridge-connected, as shown in FIG. 4B to generate an output voltage in accordance with a change in external magnetic field. Four elements constituting the other MR element 220B are located between adjacent ones of the four elements r1 to r4 of the MR element 220A, as indicated by the dotted lines in FIG. 4A. In this embodiment, since the MR elements are arranged to face the magnetic encoder attached to the motor shaft, a waveform illustrated in FIG. 5 can be obtained in accordance with a variation in magnetic field by the magnetic encoder upon motor rotation. Since the two MR elements are arranged to have a phase difference corresponding to a ¼ period of a magnetizing period of the magnetic encoder, one MR element (220A) outputs a waveform indicated by reference numeral 501 in FIG. 5, while the other element (220B) outputs a waveform electrically shifted by 90° as indicated by reference symbol 502 in FIG. 5. These waveforms are amplified by the differential amplifiers 103 and 104, and then waveshaped by the comparators 105 and 106 into square waves indicated by reference numerals 503 (corresponding to 501) and 504 (corresponding to 502). The square waves are input to the up-down clock generator 107. The clock generator 107 comprises two D flip-flops 601 and 602 and has two input terminals 603 and 604 for receiving input signals A and B, and two, i.e., up and down output terminals 605 and 606, as shown in FIG. 6. The generator 107 generates up or down clocks in accordance with phases of the input signals A and B, as will be described later. Thus, there has been described a pulsation means comprising the encoder 224, the MR elements 220A and 220B, the amplifiers 103 and 104, the comparators 105 and 106 and the up-down clock generator 107, which converts an output signal corresponding to the rotation of the rotor 211 into pulse signals. FIG. 7 shows the relationship between waveforms 603 and 604 of the signals A and B, and up-down output waveforms of outputs from the up and down output terminals 605 and 606 (in FIG. 7, two arrows indicate flows of time in up and down directions). Assuming that the signals A and B in the up direction are input to the clock generator 107 in FIG. 7, two waveforms indicated by reference numerals 701 and 702 in FIG. 7 appear at the up and down output terminals, respectively. More specifically, a pulse corresponding to a period of the magnetic encoder appears at only the up terminal, and no output appears at the down terminal. Contrary to this, if the pulse signals A and B in the down direction are input to the clock generator 107, waveforms indicated by reference numerals 703 and 704 in FIG. 7 appear at the up and down terminals, respectively. That is, since the phase relationship of the signals output from the two MR elements is determined depending on the rotation direction of the rotor (one of the two arrows in FIG. 7), an output according to the rotation direction is output from the up-down clock generator 107.

These clock signals are input to two up-down counters 108 and 111. The up-down counter 108 is a 5-bit, base-24 counter. The counter 108 performs up- or down-counting in accordance with an input up clock signal 121 and an input down clock signal 122, and outputs "0" to "23" in decimal notation as binary 5-bit signals to output terminals (bits of the 5-bit signal are respectively indicated by $B_0$, $B_1$, $B_2$, $B_3$, and $B_4$) The outputs from the counter 108 are input to the motor driving signal generator 109.

Figure 8:
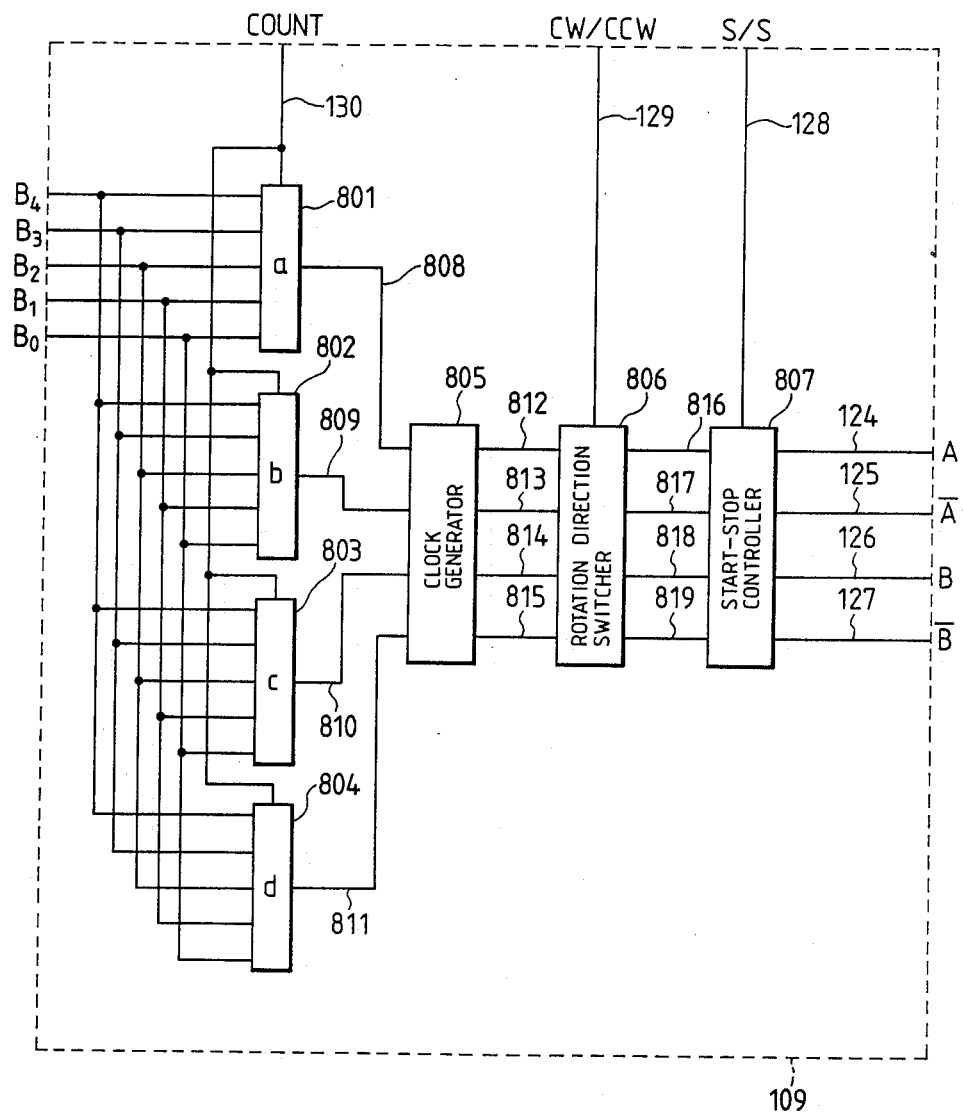
FIG. 8 is a circuit diagram of a motor driving signal generator.

The motor driving signal generator 109 comprises four digital comparators 801, 802, 803, and 804, a clock generator 805, a rotation direction switcher 806, and a start-stop controller 807, as shown in FIG. 8.

The digital comparators 801 to 804 generate clock signals when the same data as a preset value is input. Therefore, one of numerical values "0" to "23" in decimal notation is set in each of the four digital comparators as binary 5-bit data, so that when the up-down counter 108 indicates a predetermined numerical value, the comparators 801 to 804 can output corresponding pulse signals. Output signals 808, 809, 810, and 811 from these four digital comparators are input to the clock generator 805.

Figure 9:
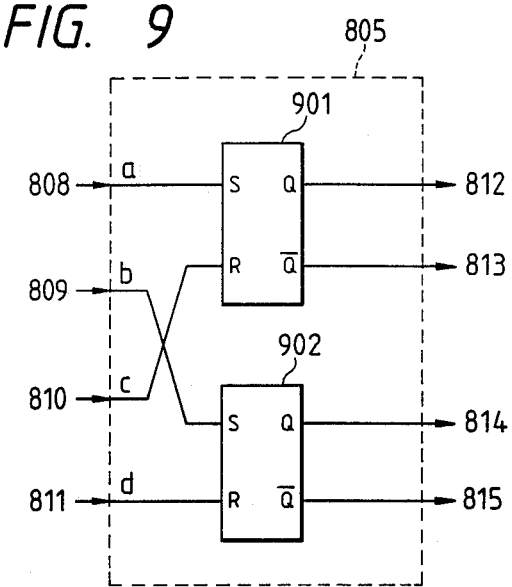
FIG. 9 is a circuit diagram of a 180° clock generator.
Figure 10:
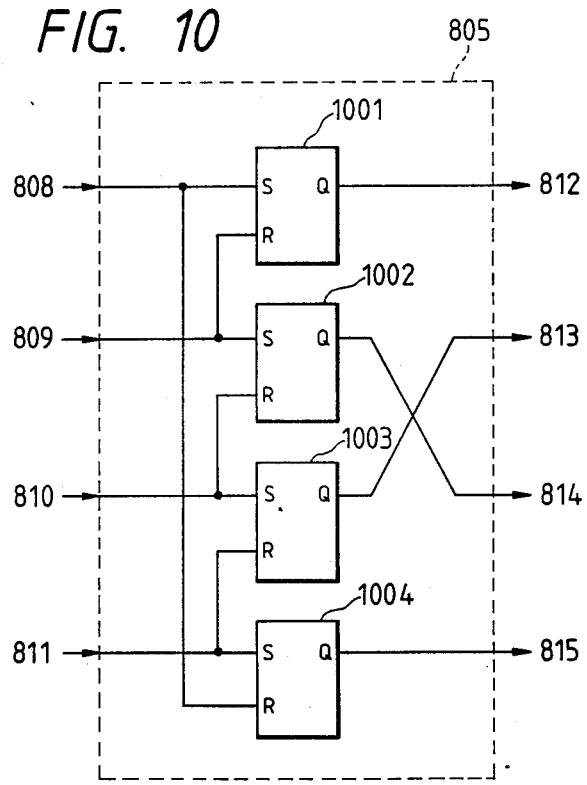
FIG. 10 is a circuit diagram of a 90° clock generator.

The clock generator 805 comprises two or four R-S flip-flops as shown in FIG. 9 or 10. In the following description, assume that the clock generator shown in FIG. 9 is employed, and values to be compared by the digital comparators are set to be a=0 ($00000_B$) (wherein B represents the binary notation), b=6 ($00110_B$), c=12 ($01100_B$), and d=18 ($11000_B$). respectively.

Figure 11:
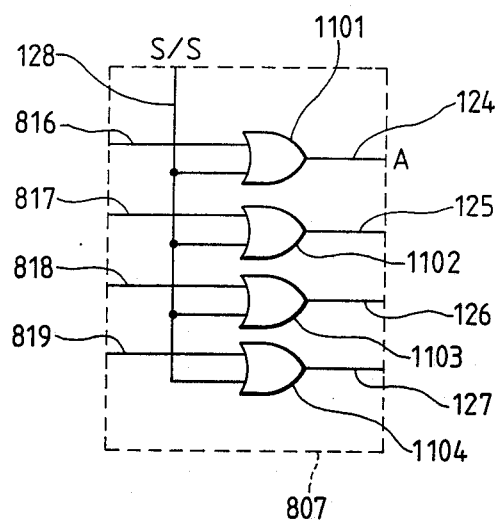
FIG. 11 is a circuit diagram of a start-stop controller.

The start-stop controller 807 is arranged as shown in FIG. 11, and has OR gates 1101 to 1104 for receiving a start-stop (S/S) signal from the external control unit 112 and the signals 816 to 819, respectively.

Figures 13A, 13B, 13C:
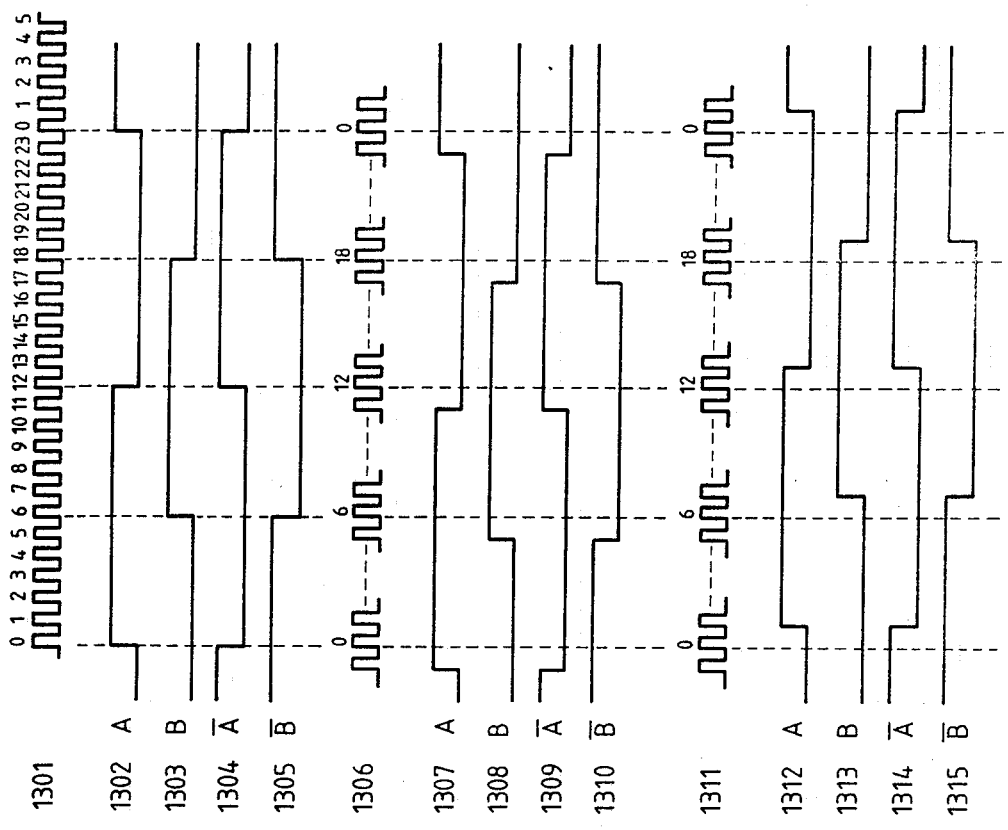
FIGS. 13A to 13C and 14 are timing charts showing different modes of the relationship among up-down counter outputs and energization switching signals.

A signal 1301 in FIG. 13A represents an input clock signal waveform (up or down) to the up-down counter 108, and a numeral above the waveform indicates a count value (decimal notation) of the counter. When the preset count values are 0, 6, 12, and 18 (decimal notation), the pulse signals 808 to 811 output from the digital comparators 801, 802, 803, and 804 are input to corresponding a to d terminals of the clock generator shown in FIG. 9. In this case, clock signals indicated by reference numerals 1302, 1303, 1304, and 1305 in FIG. 13A are output as the signals 812, 813, 814, and 815 from the four output terminals of the two R-S flip-flops 901 and 902. More specifically, these outputs are uniquely determined by the count values (decimal notation) of "0" to "23".

These signals 1302, 1303, 1304, and 1305 are energization signals to two-phase coils 2021 and 2031, and are indicated by A, B, $\overline{A}$, and $\overline{B}$, respectively. The A, B, $\overline{A}$, and $\overline{B}$ signals are supplied to a motor driving circuit 110, thus energizing the coils 2021 and 2031.

The energization direction of the A-phase coil 2031 is switched when the input clocks to the up-down counter 108 are "0" and "12", and the energization direction of the B-phase coil 2021 is switched when the input clocks to the up-down counter 108 are "6" and "18".

Paying attention to one phase, the energization direction is switched every 12 pulses, in other words, it is switched every 180° (electrical angle).

The energization switching timing is based on the output value of the up-down counter 108 with reference to positions of the magnetic poles of the rotor and of the stator magnetic poles. Speed control is made as follows. More specifically, a rotor speed signal 120 obtained based on the output signal from one MR element 220B and a signal 133 from the speed control reference signal generator 113 are compared, and the rotor speed is controlled so as to eliminate a difference therebetween. When the rotor speed is lower than a preset speed (represented by the speed control reference signal 133), a voltage applied to the coils 2021 and 2031 in the motor driving circuit 110 is increased through a phase compensation circuit 115 and a voltage controller 116 in response to a signal 134 from the comparator (speed controller) 114. When the rotor speed is higher than the preset speed, the application voltage is decreased to keep the rotor speed constant.

The values to be compared by the digital comparators can be arbitrarily set in accordance with a control signal 130 from the external control unit 112.

More specifically, in this embodiment, since the encoder pulses are segmented into 12 pulses per rotor magnetic pole, an energization timing offset from a normal one can be set.

FIG. 13B shows a case wherein an energization timing is advanced. In this case, a phase is advanced as compared to the normal energization timing (FIG. 13A).

FIG. 13C shows a case wherein an energization timing is delayed. In this case, the phase is delayed as compared to the normal energization timing (FIG. 13A).

In this manner, by advancing or delaying a phase, optimal control can be performed when a rotor speed is unstable due to acceleration/deceleration of the rotor or a variation in load. When the preset values of the comparators 801, 802, 803, and 804 are respectively a=23, b=5, c=11, and d=17, and the comparator outputs 808 to 811 are input to the clock generator shown in FIG. 9, thus, waveform signals, phases of which are advanced by one input clock pulse each, can be obtained as the output signals 812 to 815 of the clock generator 805, as indicated by reference numerals 1307 to 1310 in FIG. 13B. Similarly, when the preset values of the comparators are respectively a=1, b=7, c=13, and d=19, the output signals 812 to 815 having waveforms whose phases are delayed by one pulse each can be obtained, as indicated by reference numerals 1312 to 1315 in FIG. 13C. More specifically, the four output signals 812 to 815 having phases corresponding to the count value of the up-down counter can be arbitrarily obtained from the clock generator 805 in accordance with the external signal 130.

The output signal pattern of the clock generator 805 can be changed by changing an internal arrangement of the clock generator 805. For example, if the clock generator illustrated in FIG. 10 is used, output signals having waveform patterns A, B, and C in FIG. 14 can be obtained as the output signals 812 to 815 in response to the input signals 808 to 811 to the clock generator. As will be described later, the waveform patterns shown in FIGS. 13A to 13C obtained by the clock generator correspond to signals for driving a motor energized as a stepping motor in a two-phase magnetizing mode. The waveform patterns shown in FIG. 14 correspond to signals for driving the motor in a one-phase magnetizing mode.

The output signals 812 to 815 from the clock generator are input to the rotation direction switcher 806, as shown in FIG. 8. The rotation direction switcher 806 comprises four multiplexers, and selectively outputs the input signals in response to a motor rotation direction indication signal 129 from the external control unit 112. For example, In response to a signal 128 from the external control unit 112, the output signals 124 to 127 from the OR gates are set at "High" level, thereby stopping the motor.

In FIG. 1, the motor driving circuit 110 flows a current through the coils 2021 and 2031 (consisting of the conductive wires 209) provided to the two stators 202 and 203. In this embodiment, the driving circuit is a bipolar type driving circuit. The motor driving circuit 110 rotates the motor in the forward or reverse direction based on the output signals 124 to 126 from the motor driving signal generator 109. The up-down counter 111 is used for rotational speed control of the motor. The external control unit 112 controls the motor driving signal generator 109 based on the count data from the counter 111, thereby controlling the rotational speed of the motor.

Note that the position of the rotor can be detected by counting the signal from the magnetic sensor (MR element) 220 by the up-down counters 108 and 111. Upon power-on (initialization) before the motor is driven, a position where the magnetic poles of the rotor and stator face each other is set as an initial state, and the outputs from the up-down counters 108 and 111 are reset to 0. Thereafter, even when the motor is stopped, this setting is effective as long as a power switch is not turned off.

More specifically, one phase of the two-phase coils 2021 and 2031 is energized in a given direction. In this case, the magnetic pole of the energized stator phase faces that of the rotor magnet. At this time, reset signals 131 and 132 are supplied from the external control unit 112 to reset the outputs from the up-down counters 108 and 111 to 0. With this operation, a position data signal corresponding to a 1/12 segmented position of a rotor pole can be obtained with reference to an opposing point between the rotor and stator magnetic poles. In addition, the rotor position can be detected based on the output values from the up-down counters 108 and 111, thus allowing energization switching to the coils.

Figure 14:
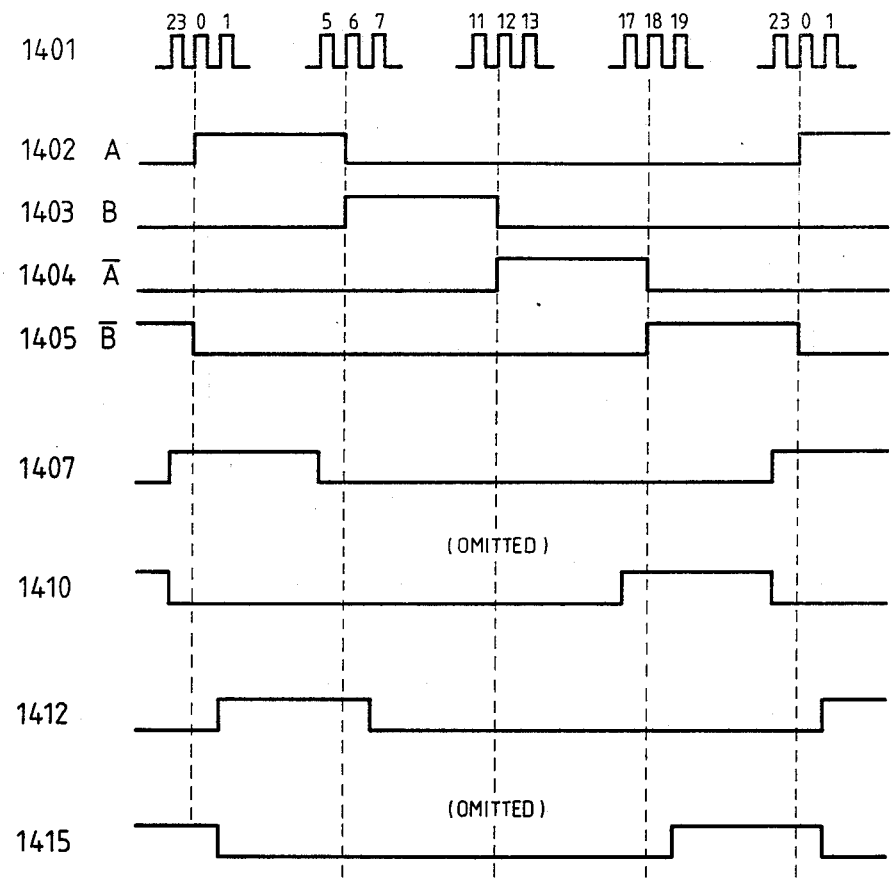

When the clock generator shown in FIG. 10 is employed, an energization timing illustrated in FIG. 14 can be obtained. FIG. 14 illustrates an encoder output waveform 1401, and energization states 1402, 1403, 1404, and 1405 of the two-phase coils 2021 and 2031, which are respectively indicated by A, B, $\overline{A}$, and $\overline{B}$. In this case, the energization direction of the A-phase coil is switched when the outputs from the up-down counter 108 are 0, 6, 12, and 18, and the energization direction of the B-phase coil is switched when the outputs from the up-down counter 108 are 0, 6, 12, and 18.

In this case, the energization direction is switched every 90° (electrical angle). This energization method is the same as a bipolar-driving one-phase magnetizing method.

Comparing with the energization method for every 180° described above, since the energization time is shortened, currents flowing through the coils are reduced to $\frac{1}{2}$. However, rotational torques obtained become about $1/\sqrt{2}$. This applies to a comparison between two- and one-phase magnetizing modes of a normal motor. These modes can be selectively used depending on driving conditions, and the like. In the energization method for every 90°, the phase of the energization timing can be readily changed in the same manner as described above (see FIG. 14).

Figure 12:
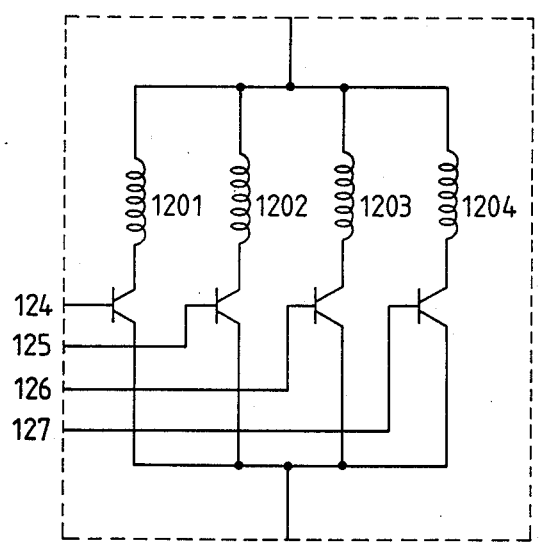
FIG. 12 is a circuit diagram of a unipolar driver for a motor.

Note that as shown in FIG. 12, four coils 1201, 1202, 1203, and 1204 are used, and four driving signals 124, 125, 126, and 127 from the motor driving signal generator 109 shown in FIG. 1 are applied, so that the motor shown in FIGS. 2 and 3 can be unipolar-driven. The same driving signal energization method as in the bipolar driving method (FIG. 1) is used. These methods may be selectively used depending on the driving conditions, and the like.

As described above, position detection of the rotor is performed by a 1/12-segmented encoder signal per pole as compared to the number of magnetic poles of the rotor, so that speed control of the motor can be stable, thus achieving optimal control. In addition, since the encoder signals are counted, the energization timing can be accurately switched. The angular position of the rotor can be detected, and position control can also be made.

Figure 15:
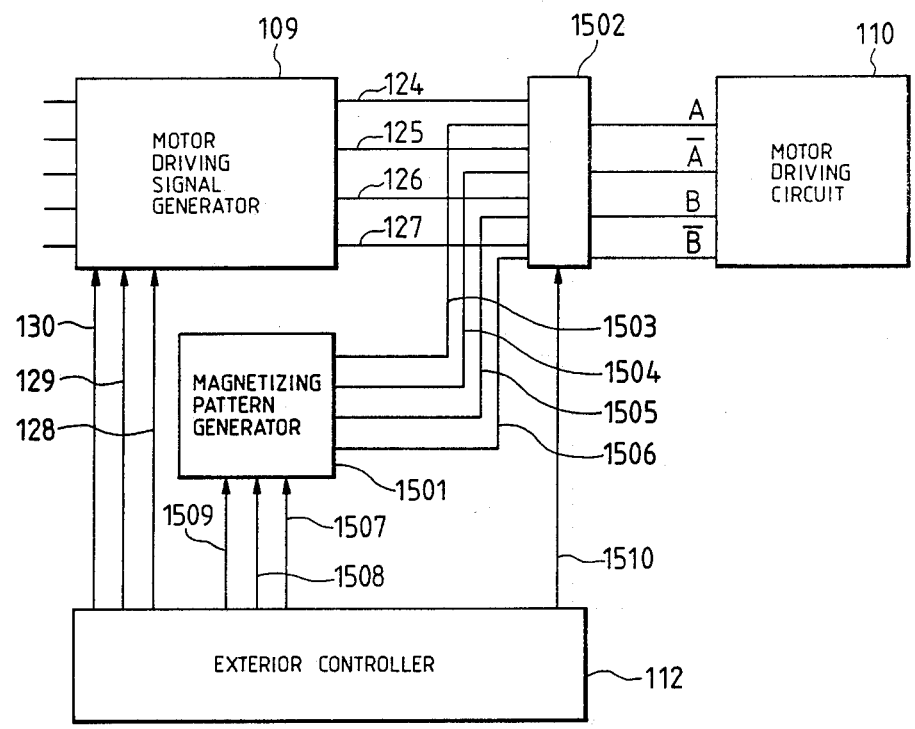
FIG. 15 is a circuit diagram of a switching circuit of continuous driving and step driving.

In the above-mentioned description of the operation, the rotor position is monitored based on the combination of the encoder and the MR elements, and when the stator and rotor magnetic poles coincide with each other, the magnetizing pattern is switched. Thus, characteristics of a conventional stepping motor are eliminated, and DC brushless motor characteristics are realized. When a driving circuit is modified, a stepping motor operation is also available. FIG. 15 illustrates a driving circuit therefor. In this circuit, a magnetizing pattern generator 1501 and a signal switcher 1502 are added to the circuit shown in FIG. 1.

The magnetizing pattern generator 1501 outputs magnetizing signals 1503, 1504, 1505, and 1506 of the two-phase stepping motor in synchronism with a driving clock signal 1507 from the external control unit (exterior controller) 112. A pattern direction can be switched and one- and two-phase magnetizing patterns can be output in accordance with a rotation direction signal 1508 and a magnetizing mode switching signal 1509 from the external control unit 112. The one-phase magnetizing pattern corresponds to the four waveforms 1402 to 1405 shown in FIG. 14, and a two-phase magnetizing pattern corresponds to the four waveforms shown in FIG. 13A.

The signal switcher 1502 comprises, e.g., a data selector, and switches the output signals 124, 125, 126, and 127 from the motor driving signal generator 109, and the output signals 1503, 1504, 1505, and 1506 from the magnetizing pattern generator 1501. More specifically, the switcher 1502 selects the former signals in accordance with a driving switching signal 1510 from the external control unit 112 to realize a DC motor operation, and selects the latter signals to realize a stepping motor operation. This can be an example of initialization of the counter of the motor described above. More specifically, the initialization of the counter is performed by magnetizing one phase of the two-phase motor. This can be easily realized by setting the driving motor in a stepping mode, and selecting the one-phase magnetizing pattern.

Figure 16:
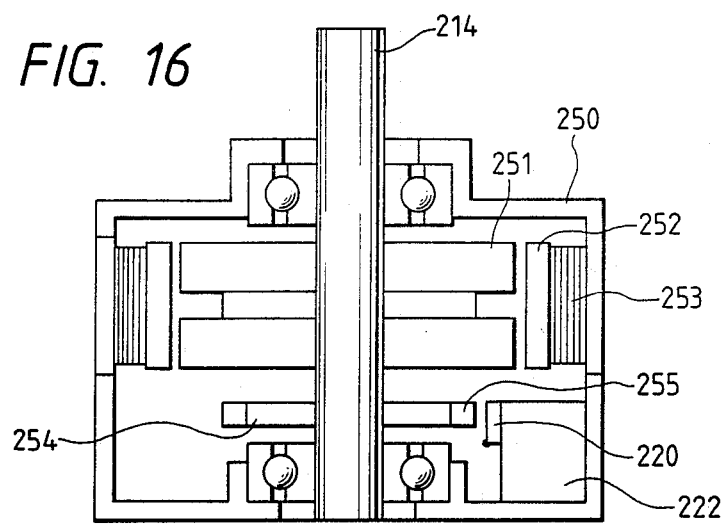
FIG. 16 is a sectional view of a second embodiment of a motor according to the present invention.

FIG. 16 is a sectional view showing another structure of the motor. In FIG. 16, a motor 250 having a hybrid stepping motor structure incorporating a magnetic encoder comprises a rotating shaft 214, a rotor 251 fixed to the rotating shaft 214 and in which 100 magnetic pole teeth are formed on the circumference of a magnetic member formed by stacking magnets, a stator 252 having a magnetic pole tooth layer on a surface opposing the rotor, a polyphase coil 253 arranged outside the stator, a magnetic encoder 254 which is arranged on the rotating shaft 214 and a circumferential edge portion of which is magnetized to have 500 poles per circumference, the same magnetic sensor 220 as in the first embodiment provided at a position facing the peripheral edge portion of the encoder 254, and a fixing member 222 for the sensor 220.

The driving control circuit shown in FIG. 1 is applied to the motor with the above structure, so that accurate alignment is unnecessary when the output pulse count and the number of rotor magnetic poles have a one-to-one correspondence like in a conventional Hall element and other encoders. Thus, the hybrid motor which can be driven as a stepping motor can be readily driven as a DC brushless motor.

In the above embodiment, a motor has been exemplified wherein an encoder having the number of poles corresponding to an integer multiple of the number of poles of a rotor magnet is arranged in a motor having a PM motor structure or a motor having a hybrid motor structure, each of which can be driven as a stepping motor. The present invention can be applied if the structural portion of the motor is arranged to be driven as a conventional DC brushless motor.

Figure 17:
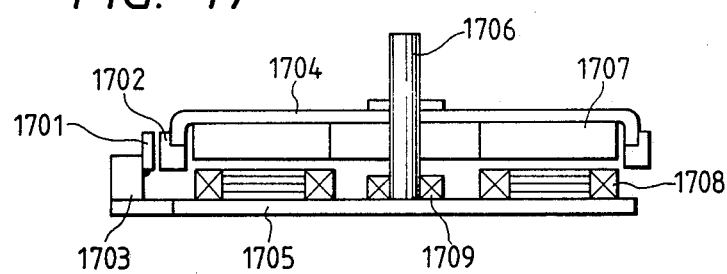
FIG. 17 is a sectional view of a third embodiment of a motor according to the present invention.

As shown in FIG. 17, a magnet 1707 which is magnetized into multiple poles on a flat disc 1704 is mounted on a rotor, and the rotor is fixed on a rotating shaft 1706. A coil 1708 is arranged on a stator 1705 facing the rotor. A magnetic encoder 1702 is mounted on the peripheral edge portion of the rotor. A magnetic sensor (MR element) 1701 is attached to the stator 1705 at a position opposing the magnetic encoder 1702. A bearing 1709 is mounted on the stator 1705. Such a structure is a so-called low-profile brushless motor.

Figure 18:
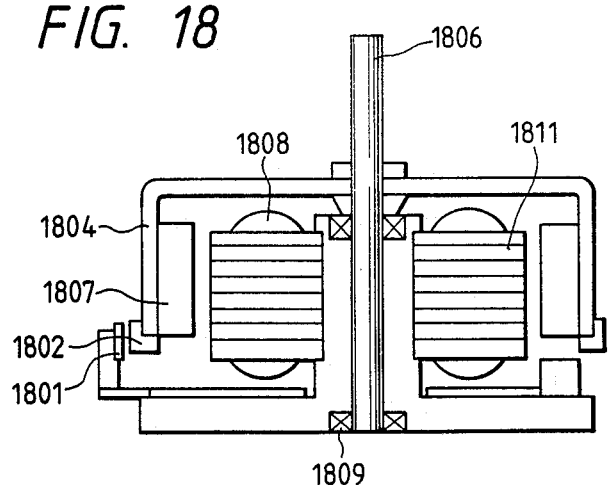
FIG. 18 is a sectional view of a fourth embodiment of a motor according to the present invention.

FIG. 18 shows a so-called outer rotor type brushless motor. A shaft 1806 is supported on a stator through bearings 1809, and a stator core 1811 around which a polyphase coil 1808 is wound is arranged on the stator. A yoke 1804 is fixed to the shaft 1806, and a magnetic encoder 1802 which has a larger number of magnetic poles (than that of the magnet 1807) is mounted on the outer surface of the yoke 1804. A magnetic sensor (MR element) 1801 is arranged on the stator at a position opposing the magnetic encoder 1802.

Figure 19:
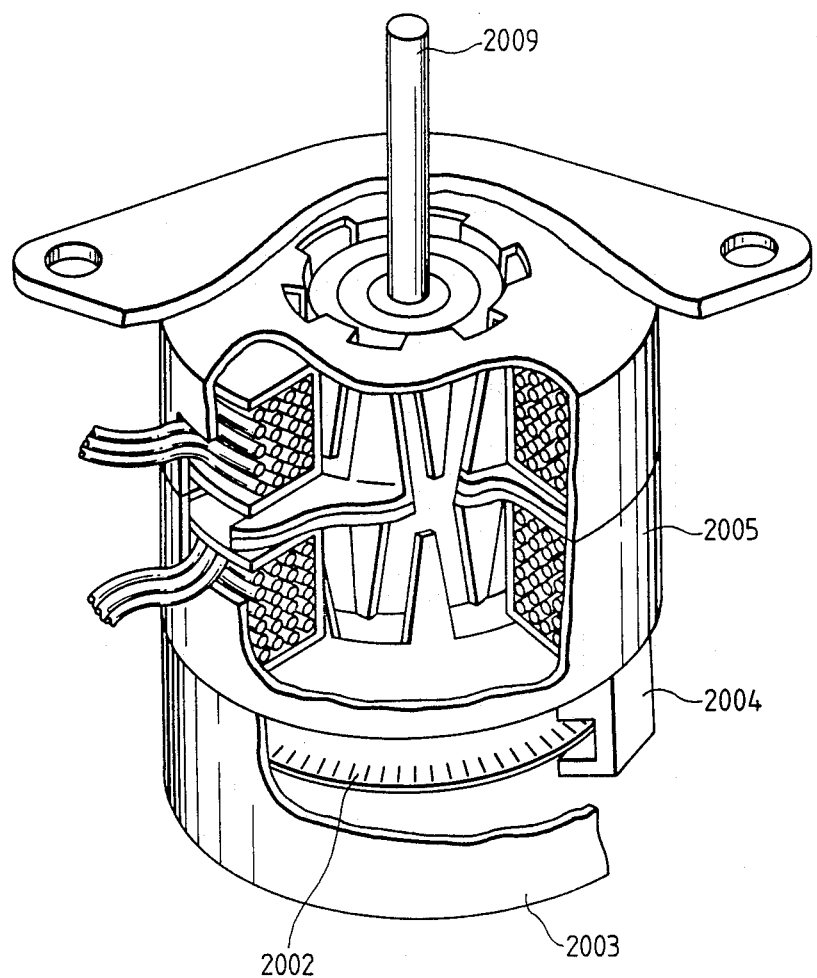
FIG. 19 is a perspective view of a fifth embodiment of a motor according to the present invention.
Figure 20:
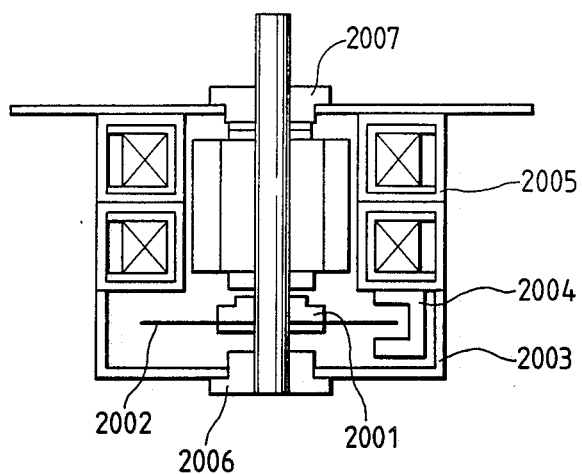
FIGS. 20 and 21 are sectional views of the fifth embodiment.
Figure 21:
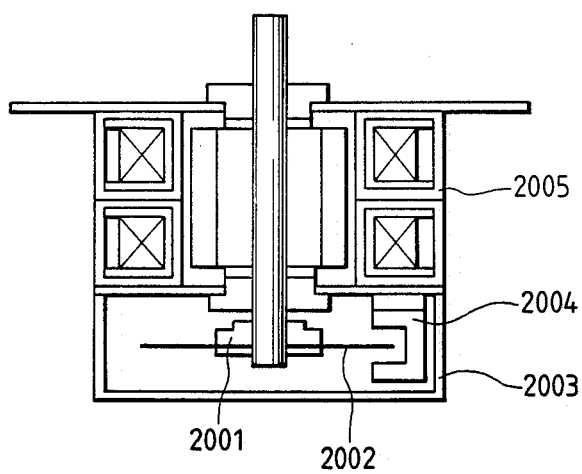

In FIGS. 19, 20, and 21, a photointerrupter is used in place of a magnetic sensor for detecting rotation of the rotor. FIG. 19 is a perspective view, and FIGS. 20 and 21 are sectional views.

This motor has the following structure. That is, a photointerrupter 2004 is attached to a motor body 2005, and a slit disc 2002 is mounted on a rotor shaft 2009. In addition, a cover 2003 is arranged around the disc 2002. Other structures are the same as those shown in FIGS. 2 and 3. The number of slits of the slit disc 2002 is larger than the number of magnetic poles of the rotor. According to the photointerrupter, signals corresponding to a pulse count larger than the number of magnetic poles of the rotor per revolutim can be easily obtained. In addition, two signals having a phase difference of 90° (electrical angle) can also be easily obtained.

FIG. 20 shows a structure wherein after the photointerrupter 2004, the slit disc 2002, and a slit disc mounting member 2001 are mounted in a motor body 205 having one bearing 2007, and then, the cover 2003 comprising a bearing 2006 is attached to the body 2005.

FIG. 21 shows a structure wherein the photointerrupter 2004, the slit disc 2002, and the slit disc mounting member 2001 are attached to the motor body 2005, and then, the cover 2003 is attached to the result assembly.

These structures may be selected depending on a manufacturing method of a motor.

Figure 22A:
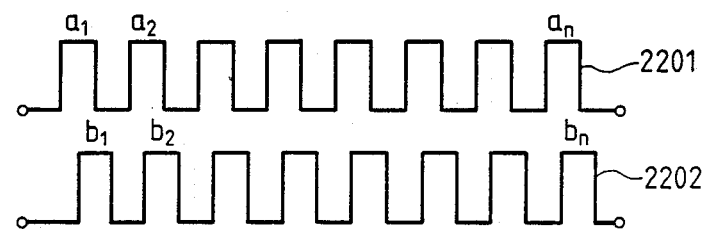
FIG. 22A is a view schematically showing a rotation detection element in a sixth embodiment of a motor according to the present invention.
Figure 22B:
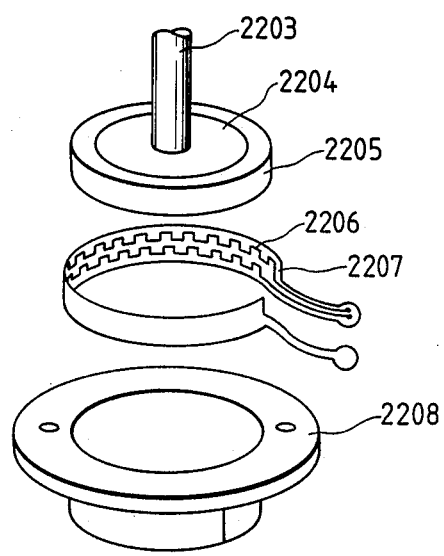
FIG. 22B is a perspective view of an encoder portion of the sixth embodiment.
Figure 22C:
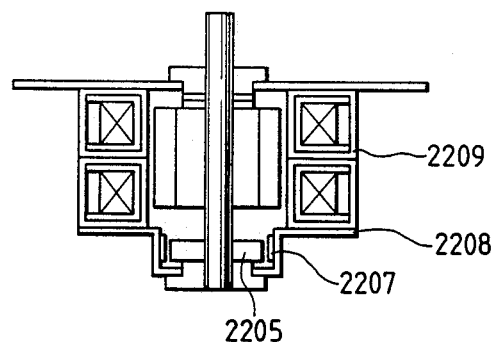
FIG. 22C is a sectional view of the sixth embodiment.

FIGS. 22A to 22C show still another embodiment of the present invention. As shown in FIGS. 22B and 22C, a motor body 2209 has the same structure as that shown in FIGS. 2 and 3. An encoder 2205 is mounted on the lower end portion of a shaft 2203. The encoder 2205 comprises a magnet which is magnetized to have a larger number of magnetic poles than the number of magnetic poles of a rotor. A substrate 2207 of a flexible material on which two conductors 2201 and 2202 as shown in FIG. 22A are formed is arranged at a position opposing the encoder 2205. The substrate 2207 is mounted inside a case 2208, and the case 2208 is mounted on the motor body 2209. The conductors 2201 and 2202 form a continuous rectangular coil pattern, as shown in FIG. 22A, and rectangles a1, a2, ..., an, and b1, b2, ..., bn are offset by a ¼ pitch.

With this structure, encoder signals having a 90° phase difference (electrical angle) can be obtained from two ends of the two conductors 2201 and 2202. The generation principle of the signals is the same as in a normal FG, and the number of rectangles is appropriately changed so as to obtain a desired signal voltage level. The number of magnetic poles of the encoder 2205 can be adjusted to be the same as a desired signal pulse count.

As described above,

1. Since a rotor position detection element such as a Hall element can be omitted, the number of parts is decreased.

2. Alignment between a position detection element and a stator magnetic pole is unnecessary during assembly. In addition, alignment between an encoder magnetic pole and a rotor magnetic pole is also unnecessary.

3. Since optimal coil energization switching can be performed in accordance with acceleration, deceleration, low-speed rotation, and load conditions, motor performance can be maximized.

4. A motor energized to be driven as a rotation direction can be detected.

5. A DC brushless motor can be arbitrarily switched between 180° and 90° energization modes, i.e., two-phase, one-phase, and one-two-phase energization modes as in a motor energized to be driven as a stepping motor.

6. In a motor having a hybrid motor structure and arranged to be driven as a stepping motor, if the number of magnetic poles of a rotor is 100, rotation control is performed based on a rotation detection signal of a rotor obtained using a multipole magnetized magnetic encoder (500 pulses/circumference) and an MR element sensor, so that a hybrid motor arranged to be driven as a stepping motor can be driven as a DC brushless motor, which is impossible in a conventional motor since accurate alignment of a sensor is necessary.

FIGS. 23 to 28 show still another embodiment of the present invention. This embodiment provides a circuit arrangement which can prevent the digital comparators (801 to 804) and the clock generator (805) in the motor driving signal generator (FIG. 8) in the above embodiment from an erroneous operation due to electrical noise.

Figure 23:
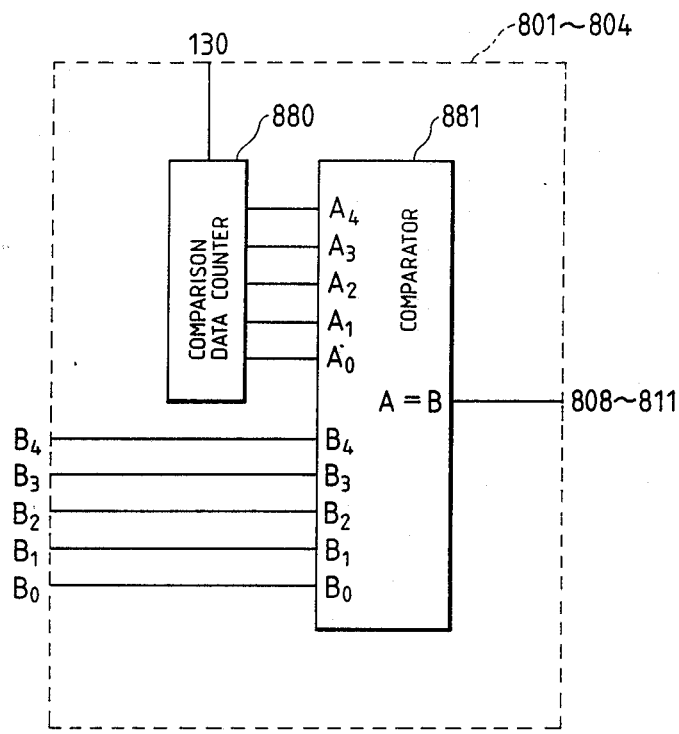
FIG. 23 is a circuit diagram of a digital comparator used in the embodiment shown in FIG. 8.

The digital comparators (801 to 804) in the first embodiment can have an arrangement shown in FIG. 23. A digital comparator shown in FIG. 23 comprises a comparison data counter 880 in which comparison data ($A_0$ to $A_4$) are set in response to an external signal 130, and a comparator 881. The comparator 881 compares inputs ($B_0$ to $B_4$) from an up-down counter 108 with inputs ($A_0$ to $A_4$) from the data counter 880. When A=B, the comparator 881 outputs Low-level signals from the corresponding output terminals (808 to 811); when A≠B, outputs High-level signals therefrom.

Figure 24:
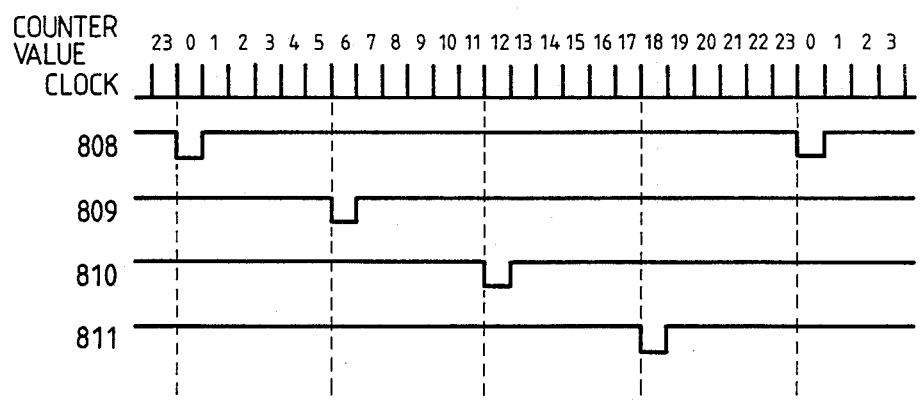
FIG. 24 is an output waveform chart of the digital comparator.

FIG. 24 shows waveforms of outputs from the output terminals 808 to 811 of one of the digital comparators to 804 shown in FIG. 23. The signals having waveforms shown in FIG. 24 are input to the clock generator 805 shown in FIG. 9. The clock generator 805 comprises two flip-flops. When regular waveform signals are input to these flip-flops as shown in FIG. 24, they are normally operated, and output waveform signals shown in FIG. 13A. However, when a motor according to the present invention is assembled in a printer or a copying machine, the motor suffers from noise due to a printing operation of the printer or electrical noise from respective sections of the copying machine. The electrical noise appears in the output waveforms of the digital comparators shown in FIG. 23 as a noise signal. For this reason, the clock generator 805 comprising the flip-flops shown in FIG. 9 cannot output regular signal waveforms shown in FIG. 13A.

Figure 25:
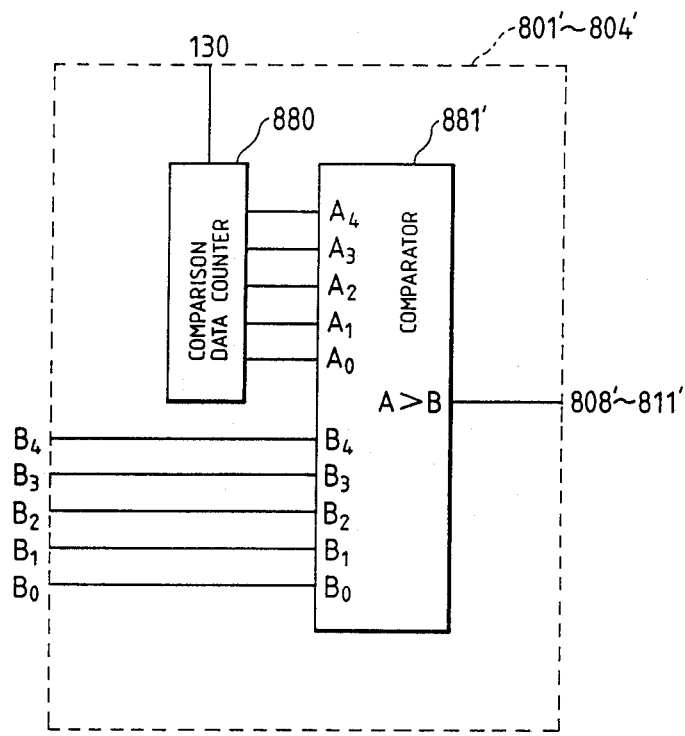
FIG. 25 is a circuit diagram showing another arrangement of a digital comparator.
Figure 26:
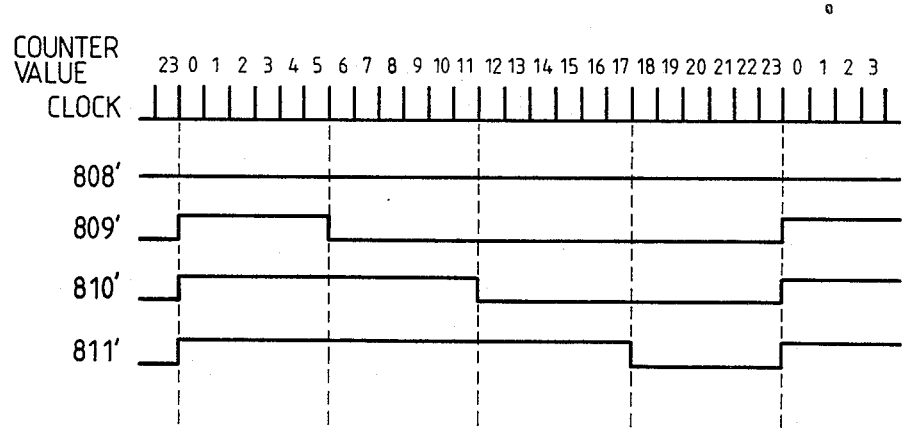
FIG. 26 is an output waveform chart of the digital comparator shown in FIG. 25.
Figure 27:
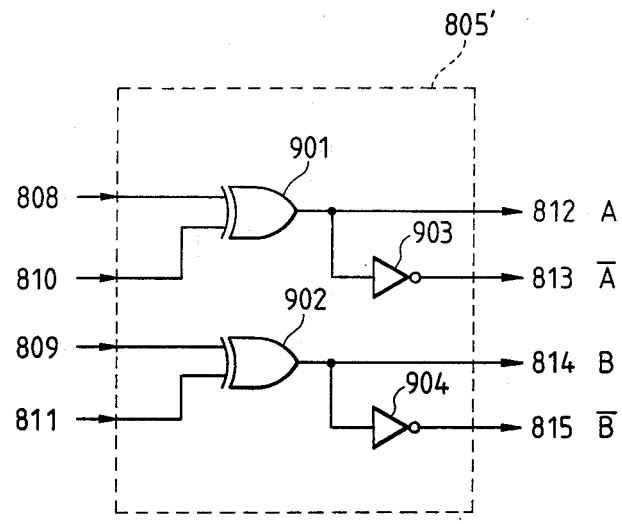
FIG. 27 is a circuit diagram showing another arrangement of the clock generator.

FIGS. 25 to 27 show an arrangement wherein a countermeasure against electrical noise is taken. FIG. 25 shows one of digital comparators 801' to 804' used in this arrangement. The comparator 801' comprises a comparator 881' which receives inputs ($B_0$ to $B_4$) from the up-down counter 108 and signals $A_0$ to $A_4$ from the comparison data counter 880 and compares the A and B signals. When A>B, the comparator 881' outputs High-level signals; when A<B, outputs Low-level signals. Each of the digital comparators 801' to 804' of this arrangement compares the A and B signals, and outputs waveforms 808' to 811' shown in FIG. 26. A clock generator shown in FIG. 27 comprises exclusive-OR gates 901 and 902, and inverters 903 and 904. Output waveforms 812 to 815 of the clock generator 805' are the same as waveforms 1307 to 1310 shown in FIG. 13B. The above arrangements, i.e., the digital comparator shown in FIG. 25, and the clock generator shown in FIG. 27 are employed, so that the output signals from the clock generator are not adversely affected by the electrical noise.

The clock generator shown in FIG. 9 is used for the two-phase driving mode. The clock generator shown in FIG. 10 is used for a one-phase driving mode. In this case, since the clock generator shown in FIG. 10 comprises flip-flops, it is adversely affected by external electrical noise.

Figure 28:
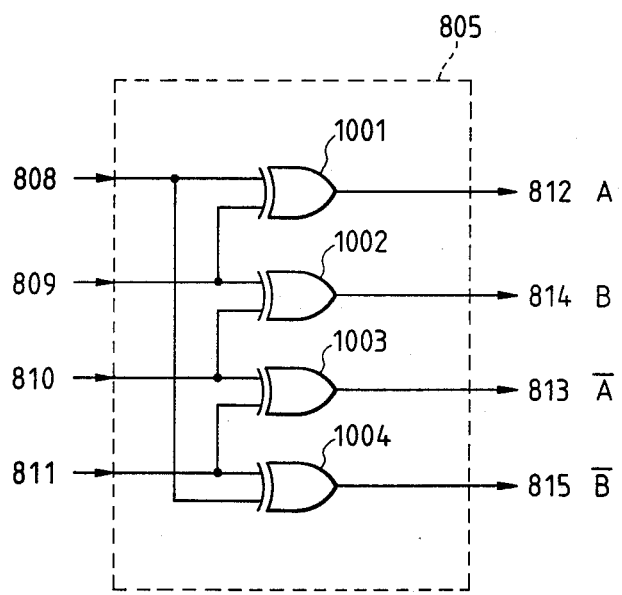
FIG. 28 is a circuit diagram showing still another arrangement of the clock generator.

FIG. 28 shows a clock generator taking a countermeasure against electrical noise for the one-phase driving mode. The clock generator shown in FIG. 28 comprises exclusive-OR gates 1001 to 1004. The output waveforms of output signals 812 to 815 of the clock generator shown in FIG. 28 correspond to waveforms 1402 to 1405 illustrated in FIG. 14.

Figure 29:
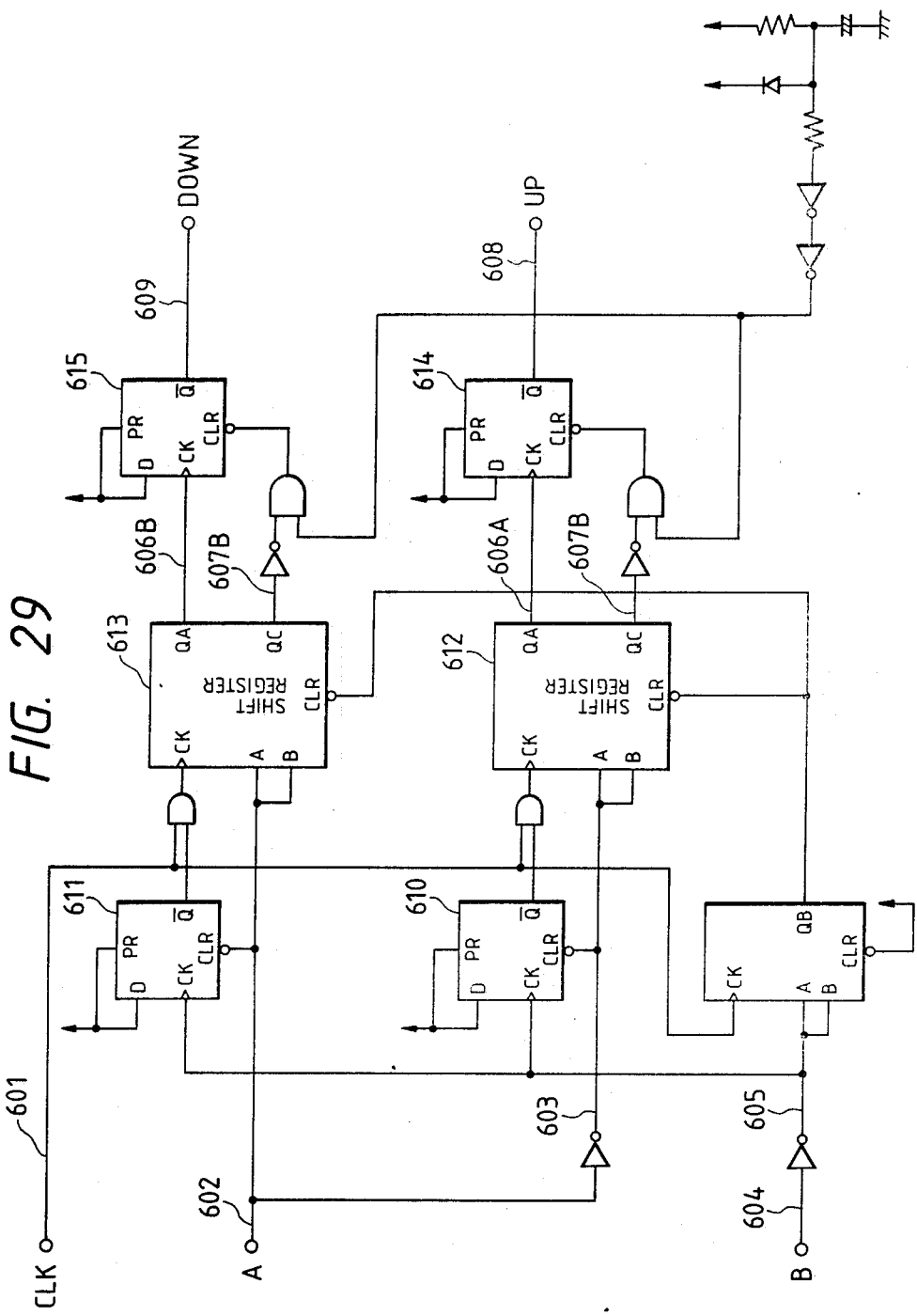
FIG. 29 is a circuit diagram showing another arrangement of the up-down clock generator.
Figure 30:
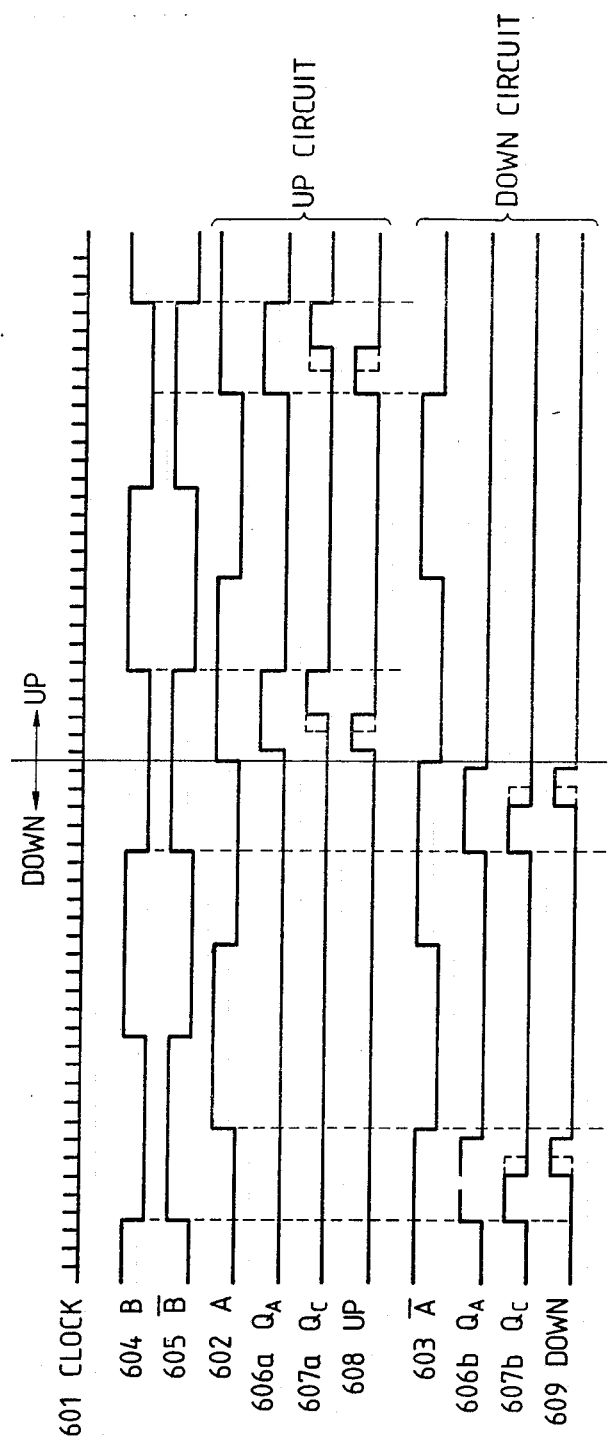
FIG. 30 is a waveform chart of the clock generator shown in FIG. 30.

FIGS. 29 and 30 show an improvement of the up-down clock generator shown in FIG. 6.

The up-down clock generator 107 shown in FIG. 6 comprises the two flip-flops 601 and 602. In the circuit shown in FIG. 6, the waveform of a count signal in an up or down direction is switched in response to the leading edge of the signal 604 or 603 shown in FIG. 7. Therefore, signal switching timings in the up and down directions differ from each other by a shift in pulse width of the input signals A and B. The flip-flops 601 and 602 of the up-down clock generator are easily influenced by ON/OFF switching due to external electrical noise, and cause an error in up and down clock signals. In the arrangement of FIGS. 29 and 30, signals are input to the flip-flops for switching up and down directions by controlling shift registers and clock pulses, thereby solving the above problem.

An up-down clock generator 107 is arranged as shown in FIG. 29, and has an external clock terminal 601, two input terminals 602 and 604 for receiving input signals A and B, and two output terminals 608 and 609 for up and down clocks. The generator 107 generates up or down clocks in synchronism with an external clock signal in accordance with a phase relationship between the input signals A and B, as will be described later.

FIG. 30 shows the relationship among the external clock signal 601 (its pulse width illustrated in FIG. 30 is larger than an actual one), waveforms 602 and 604 of the signals A and B, and an up-down output waveform 608/609. Note that in FIG. 30, two arrows indicate flows of time in up and down directions.

An up-down clock signal is generated at an identical point of an encoder regardless of a rotation direction. A clock signal is generated in response to the leading edge of the signal A in the up direction and in response to the trailing edge of the signal A in the down direction.

A shift register 612 shown in FIG. 29 detects the leading edge of the signal A in synchronism with the external clock signal, and a shift register 613 detects the trailing edge of the signal A in synchronism with the external clock signal. These shift registers then output clock signals (signals 606A and 606B) to corresponding output terminals QA. In this case, the external clock signal is controlled by the flip-flops 610 and 611, so that only the shift register 612 is operated in the up direction and only the shift register 613 is operated in the down direction. The shift registers 612 and 613 according to the rotation direction are operated in synchronism with the external clock signal, and output shift signals 607A and 607B from other output terminals QC. Then, a difference between the signals QA and QC is calculated by a flip-flop connected to the outputs of the shift register, thus obtaining up or down clock signal 608 or 609.

Since these clock signals are synchronous with the external clock signal 601, the pulse width of the up-down clock signal can be arbitrarily set by changing a frequency of the external clock signal or by deriving the output from the shift register 612 or 613 from other terminals. The pulse width is preferably set to fall within several μsec to several hundreds of μsec in order to accurately derive up or down clock signal when a motor which repeats forward and reverse rotation is so operated. Since the shift registers 612 and 613 detect the leading and trailing edges of the signal A in synchronism with the external clock signal, a delay time corresponding to a maximum of a clock width may be formed. In order to eliminate the influence of this error, the clock width is preferably set as described above.

More specifically, when the signals A and B in the up direction in FIG. 30 are input to the clock generator 107, two waveforms indicated by reference numerals 608 and 609 (right half in FIG. 30) appear at the up-down output terminals. More specifically, a pulse signal corresponding to rotation of the magnetic encoder appears at the up terminal, and no output appears at the down terminal. When the pulse signals A and B in the down direction are input in FIG. 30, waveforms indicated by reference numerals 608 and 609 (left half in FIG. 30) appear at the up and down terminals. More specifically, since the phase relationship of signals output from the two MR elements is determined to be one of the two arrows shown in FIG. 30 in accordance with the rotation direction of the rotor, the output according to the rotation direction is output from the up-down clock generator 107.

The up-down clock generator described above can be constituted by only a logic circuit including neither resistor nor capacitor. Therefore, the up-down clock generator can be realized to be very small by preparing a special-purpose IC. Since the clock generator is not easily influenced by a change in environmental condition, stable clock outputs can be obtained.

What is claimed is:

1. A motor control apparatus comprising:
   an encoder fixed to a shaft of a rotor and having portions to be detected corresponding in number to an integer multiple of the number of magnetic poles of said rotor;
   count means for counting the number of portions to be detected of said encoder upon rotation of said rotor at a predetermined position on a side of a stator; and
   means for, when a count value from said count means has reached a predetermined value, performing energization switching to a coil of said stator.

2. An apparatus according to claim 1, further comprising:
   up-down clock generating means capable of setting a pulse width of an up-down clock pulse to be supplied to said count means in synchronism with an external clock pulse and in correspondence with said portions to be detected.

3. An apparatus according to claim 1, further comprising:
   switching means for switching a driving signal from said means and said external control unit in accordance with a signal from an external control unit capable of generating a pattern for driving a stepping motor in accordance with a rotational position of said rotor.

4. An apparatus according to claim 1, wherein said energization switching means comprises a plurality of digital comparators taking output states corresponding to numerical values indicated by said count means, and motor driving signal generating means for generating coil energization signals corresponding to the output states.

5. A control device for a stepping motor with a rotor having a magnet fixed to a rotating shaft, two sets of stators having magnetic segments provided at the outer periphery of said magnet, two sets of coils for magnetizing said magnetic segments, and motor driving means for controlling electric supply to said coils, said control device being characterized by
   pulsation means for converting an output signal corresponding to the rotation of the rotor into pulse signals;
   an up-down counter for counting the pulse signal of said pulsation means and producing a count value in response to said pulse signals; and
   a motor driving signal generator for energizing said coils in response to the count value of said up-down counter, said motor driving signal generator at least having a comparator for comparing the count value of said up-down counter with a preset value, and a clock generator for supplying an output signal from said comparator as an energizing signal to said coils.

6. A control device according to claim 5, wherein said comparator is constructed to recive an external signal from an external control device to change the preset value.

7. A control device according to claim 5, wherein said clock generator is constituted by a plurality of exclusive OR gates.

8. A control device according to claim 5, wherein said pulsation means includes:
   means having a comparator for converting an output signal corresponding to the rotation of the rotor into pulse signals; and an up-down clock generator for generating a count signal of upward or downward direction in correspondence with the rotating direction of the rotor, said up-down clock generating having flip-flop circuits for receiving the pulse signals from said comparator, a clock pulse generator, and a shift register for receiving the signals from said flip-flop circuits and said clock generator.

9. In combination, a motor capable of being driven either as a stepping motor or as a brushless DC motor, and a control for said motor, said motor comprising:
   a rotor having a magnet fixed to a rotating shaft;
   a stator having magnetic segments provided at the outer periphery of said magnet and;
   a coil for magnetizing said magnetic segments; said control device comprising:
      a motor driving signal generator for controlling the rotation of said rotor and for counting the pulse signals to produce pulse count signals;
      a motor driving signal generator having a digital comparator for receiving the pulse count signals and for producing an output signal when the pulse count signals attain a predetermined value, and a clock generator for generating an energization signal for said coil on the basis of the output signal of said digital comparator;
      an external controller for outputting external signals including a brushless DC motor drive signal and a clock signal for driving a step motor;
      a magnetizing pattern generator for outputting a magnetization signal corresponding to the driving clock signal from said external controller; and
      a signal switch for changing the input signal of said motor driving signal generator by inputting to said coil a signal corresponding to the signal of said motor driving a signal generator and the signal of said magnetizing pattern generator, said signal switch being operated by the signal from said external controller, the driving state of said motor being selected by the switching of said signal switch between the clock signal on the basis of the signal from said magnetization pattern generator and the brushless DC motor drive signal on the basis of the signal from said motor driving signal generator.

10. A control device for a stepping motor with a rotor having a magnet fixed to a rotating shaft, a stator having magnetic segments provided at the outer periphery of said magnet, a coil for magnetizing said magnetic segments, and motor driving means for controlling electric supply to said coil, said control device being characterized by
   pulsation means for converting an output signal corresponding to the rotation of the rotor into pulse signals;
   an up-down counter for counting the pulse signals of said pulsation means and producing a count value in response to said pulse signals; and
   a motor driving signal generator for energizing said coil in response to the count value of said up-down counter, said motor driving signal generator at least having a comparator for comparing the count value of said up-down counter with a present value, and a clock generator for supplying an output signal from said comparator as an energizing signal to said coil.

* * * * *

UNITED STATES PATENT AND TRADEMARK OFFICE
CERTIFICATE OF CORRECTION

PATENT NO. : 4,963,808

DATED : October 16, 1990

INVENTOR(S) : Akira Torisawa et al.

It is certified that error appears in the above-identified patent and that said Letters Patent is hereby corrected as shown below:

ON TITLE PAGE:

[73] Assignee:

"Canon Kabushiki Kaisha, Tokyo, Japan" should read --Canon Kabushiki Kaisha; Canon Seiki Kabushiki Kaisha, both of Tokyo, Japan--.

[56] References Cited:
U.S. Patent Documents

"Shimigu et al." should read --Shimizu et al.--.

FOREIGN PATENT DOCUMENTS:

"0023123  7/1980   European Pat. Off.
 0027867  8/1980   European Pat. Off."
           should read
--0023123  1/1981   European Pat. Off.
 0027867  5/1981   European Pat. Off.--

COLUMN 1:

Line 15, "DC motor" should read --DC motor,--.
Line 22, "(1Position" should read --(1)Position--.

COLUMN 3:

Line 52, "The" should read --¶ The--.

UNITED STATES PATENT AND TRADEMARK OFFICE
CERTIFICATE OF CORRECTION

PATENT NO. : 4,963,808

DATED : October 16, 1990

INVENTOR(S) : Akira Torisawa et al.

It is certified that error appears in the above-identified patent and that said Letters Patent is hereby corrected as shown below:

COLUMN 5:

Line 57, "$B_4$) The" should read --$B_4$). The--.

COLUMN 6:

Line 34, "A, B, $\overline{A}$, and B" should read

--A, B, $\overline{A}$, and $\overline{B}$,--.

COLUMN 7:

Line 13, "load. When" should read --load. ¶ When--.
    Line 52, "In" should read --in--.

COLUMN 8:

Line 39, "Comparing" should read --Compared--.

COLUMN 10:

Line 40, "revolutim" should read --revolution--.
    Line 45, "motor body 205" should read --motor body 2005--.

UNITED STATES PATENT AND TRADEMARK OFFICE
CERTIFICATE OF CORRECTION

PATENT NO. : 4,963,808

DATED : October 16, 1990

INVENTOR(S) : Akira Torisawa et al.

It is certified that error appears in the above-identified patent and that said Letters Patent is hereby corrected as shown below:

COLUMN 11:

Line 60, "comparators to" should read --comparators 801 to--.

COLUMN 14:

Line 57, "recive" should read --receive--.

COLUMN 15:

Line 2, "generat-" should read --generator--.
　　Line 3, "ing" should be deleted.
　　Line 10, "control" should read --control device--.
　　Line 16, "controlling the" should read --controlling the energization of said coil;
　　　¶ means for outputting pulse signals corresponding to the--.

COLUMN 16:

Line 30, "present" should read --preset--.

Signed and Sealed this

Twenty-fifth Day of February, 1992

*Attest:*

HARRY F. MANBECK, JR.

*Attesting Officer*　　*Commissioner of Patents and Trademarks*